US007020402B2

(12) United States Patent
Shanbhag et al.

(10) Patent No.: US 7,020,402 B2
(45) Date of Patent: Mar. 28, 2006

(54) CROSSTALK COMPENSATION ENGINE FOR REDUCING SIGNAL CROSSTALK EFFECTS WITHIN A DATA SIGNAL

(75) Inventors: Abhijit G. Shanbhag, San Jose, CA (US); Abhijit M. Phanse, Santa Clara, CA (US)

(73) Assignee: Scintera Networks, Inc., San Jose, CA (US)

( * ) Notice: Subject to any disclaimer, the term of this patent is extended or adjusted under 35 U.S.C. 154(b) by 351 days.

(21) Appl. No.: 10/179,689

(22) Filed: Jun. 24, 2002

(65) Prior Publication Data

US 2003/0235145 A1 Dec. 25, 2003

(51) Int. Cl.
*H04J 14/02* (2006.01)
*H04B 10/00* (2006.01)
*H04B 10/02* (2006.01)
*H04B 10/04* (2006.01)

(52) U.S. Cl. ......................... 398/181; 398/81; 398/158; 398/192

(58) Field of Classification Search .................. 398/81, 398/158, 181, 192, 193, 194; 375/285, 346; 370/201

See application file for complete search history.

(56) References Cited

U.S. PATENT DOCUMENTS

| | | | | | |
|---|---|---|---|---|---|
| 4,995,104 | A | * | 2/1991 | Gitlin | 370/201 |
| 5,086,423 | A | * | 2/1992 | Streit et al. | 370/201 |
| 5,191,462 | A | | 3/1993 | Gitlin et al. | |
| 6,307,984 | B1 | * | 10/2001 | Watanabe | 385/24 |
| 6,522,450 | B1 | * | 2/2003 | Zenteno | 359/260 |
| 2002/0012144 | A1 | * | 1/2002 | Lin et al. | 359/130 |

OTHER PUBLICATIONS

PCT Written Opinion, Aug. 27, 2004, PCT/US03/18985.

* cited by examiner

*Primary Examiner*—Jason Chan
*Assistant Examiner*—Dzung D. Tran
(74) *Attorney, Agent, or Firm*—Vedder Price Kaufman & Kammholz, P.C.

(57) ABSTRACT

A crosstalk compensation engine for reducing signal crosstalk effects within a data signal. Demultiplexed data signals corresponding to multiplexed data signals received via a signal transmission medium are processed to significantly reduce one or more signal crosstalk products related to one or more interactions among the multiplexed data signals within the signal transmission medium. Such signal crosstalk products include those resulting from dense wavelength-division mutiplexing of the data signals used to provide the multiplexed data signals, four-wave mixing among the multiplexed data signals within the signal transmission medium, and cross-phase modulation among the multiplexed data signals within the signal transmission medium.

6 Claims, 12 Drawing Sheets

CROSSTALK COMPENSATION ENGINE FOR REDUCING SIGNAL CROSSTALK EFFECTS WITHIN A DATA SIGNAL

BACKGROUND OF THE INVENTION

1. Field of the Invention

The present invention relates to compensation of data signals, and in particular, to compensation for signal crosstalk products within data signals that have been multiplexed and conveyed by a signal transmission medium, wherein such signal crosstalk products are related to one or more interactions among the multiplexed data signals within the signal transmission medium.

2. Description of the Related Art

Referring to FIG. 1, a conventional fiber optic signal system 10 often uses wavelength-division multiplexing (WDM) to increase the signal capacity of the fiber optic signal transmission medium. Accordingly, such a system 10 will typically include multiple optical signal transmitters 12, an optical multiplexor 14, the fiber optic medium 16, an optical demultiplexor 18 and multiple optical signal receivers 20, all interconnected substantially as shown.

As is well known in the art, electrical data signals 11 are converted by the optical signal transmitters 12 to optical signals 13, which are then multiplexed by the muliplexor 14 to provide the multiplexed signal 15 containing all of the optical channels at the various wavelengths λ1, λ2, λ3, . . . , λn. This multiplexed signal 15 is then conveyed by the fiber optic signal transmission medium 16. At the end of the fiber optic signal path 16 the received signal 17, which will have a number of signal crosstalk products (discussed in more detail below), is demultiplexed by the demultiplexor 18. The resulting individual optical signals 19 are then converted by the optical signal receivers 20 to corresponding electrical data signals 21.

To varying degrees, each of the demultiplexed optical data signals 19*a*, 19*b*, 19*c*, . . . , 19*n* will include one or more signal crosstalk products related to one or more interactions among these signals during their conveyance as a single multiplexed signal through the fiber optic signal transmission medium 16 (discussed in more detail below). These signal crosstalk products generally remain (and may become worse) and become part of the corresponding electrical data signals 21*a*, 21*b*, 21*c*, . . . , 21*n*. Such signal crosstalk products can be generated by a number of well known signal interactions that often take place within a signal transmission medium such as an optical fiber, and include those caused by dense wavelength-division multiplexing (DWDM), four-wave mixing (FWM) and cross-phase modulation (XPM).

In the case of DWDM, signal interactions increase as the channel spacing between the optical signals decreases. As is well known, channel density is a key parameter in WDM systems. An international standard specifies standard center frequencies to be separated by 100 gigahertz (GHz), corresponding to approximately 0.8 nanometers in an erbium-fiber amplifier band. Some commercial optics systems use frequency spacing on a 50 GHz grid. Further developments may reduce channel spacing to 25 GHz or perhaps even 12.5 GHz. In any event, as channel spacing becomes more dense, the likelihood and degree to which signal interactions take place increase significantly.

Referring to FIG. 2, one well known nonlinear effect in WD systems is that of FWM in which three input frequencies interact by combining within the signal transmission medium to generate a mixed signal at a fourth frequency. For example, the signals at frequencies υ1, υ2, υ3 may interact or combine in such a manner that the signals at υ1 and υ2 are summed while the signal at υ3 is subtracted in frequency, thereby producing a signal at υ4. (It should be noted that the three input signals υ1, υ2, υ3 need not be at their own respective frequencies; two of them could be on the same optical channel.) Equal spacing of WDM channels can cause the newly generated signal υ4 to fall within another optical signal channel, thereby producing noise and crosstalk that interferes with the original signal on that channel. The amount of FWM is proportional to the length of the transmission medium over which such signal interactions take place. While such nonlinear signal interactions tend to be relatively weak in glass fiber, the strength of these interactions accumulate with distance.

Another nonlinear effect is that of XPM in which variations in the intensity of one optical signal channel can cause changes in the refractive index of the fiber optic medium, thereby affecting other optical signal channels. Such changes in the refractive index modulate the phase of the light within the other optical signal channels (as well as increase self-phase modulation of the reference channel, i.e., that channel causing such change in the refractive index). The strength of XPM effects increases with the number of optical signal channels, and increases further as the channel spacing becomes more dense.

SUMMARY OF THE INVENTION

A crosstalk compensation engine for reducing signal crosstalk effects within a data signal. Demultiplexed data signals corresponding to multiplexed data signals received via a signal transmission medium are processed to significantly reduce one or more signal crosstalk products related to one or more interactions among the multiplexed data signals within the signal transmission medium. Such signal crosstalk products include those resulting from dense wavelength-division mutiplexing of the data signals used to provide the multiplexed data signals, four-wave mixing among the multiplexed data signals within the signal transmission medium, and cross-phase modulation among the multiplexed data signals within the signal transmission medium.

In accordance with one embodiment of the presently claimed invention, a crosstalk compensation engine for reducing signal crosstalk effects within a data signal includes a plurality of input signal terminals, an output signal terminal and crosstalk compensation circuitry. The plurality of input signal terminals convey a plurality of demultiplexed data signals corresponding to a plurality of multiplexed data signals received via a signal transmission medium, wherein first and second ones of the plurality of demultiplexed data signals correspond to first and second ones of the plurality of multiplexed data signals, respectively, and the first demultiplexed data signal includes a first signal crosstalk product related to an interaction among at least the first and second ones of the plurality of multiplexed data signals within the signal transmission medium. The output signal terminal conveys an output data signal corresponding to the first demultiplexed data signal and including a second signal crosstalk product corresponding to the first signal crosstalk product, wherein a ratio of the second signal crosstalk product and the output data signal is substantially less than another ratio of the first signal crosstalk product and the first demultiplexed data signal. The crosstalk compensation circuitry, coupled between the plurality of input signal terminals and the output signal terminal, processes the plurality of demultiplexed data signals to provide the output data signal.

In accordance with another embodiment of the presently claimed invention, a crosstalk compensation engine for reducing signal crosstalk effects within a data signal includes input signal means, output signal means and crosstalk compensation means. The input signal means is for conveying a plurality of demultiplexed data signals corresponding to a plurality of multiplexed data signals received via a signal transmission medium, wherein first and second ones of the plurality of demultiplexed data signals correspond to first and second ones of the plurality of multiplexed data signals, respectively, and the first demultiplexed data signal includes a first signal crosstalk product related to an interaction among at least the first and second ones of the plurality of multiplexed data signals within the signal transmission medium. The output signal means is for conveying an output data signal corresponding to the first demultiplexed data signal and including a second signal crosstalk product corresponding to the first signal crosstalk product, wherein a ratio of the second signal crosstalk product and the output data signal is substantially less than another ratio of the first signal crosstalk product and the first demultiplexed data signal. The crosstalk compensation means is for processing the plurality of demultiplexed data signals and providing the output data signal.

In accordance with still another embodiment of the presently claimed invention, a method for reducing signal crosstalk effects within a data signal includes:

receiving a plurality of demultiplexed data signals corresponding to a plurality of multiplexed data signals received via a signal transmission medium, wherein first and second ones of the plurality of demultiplexed data signals correspond to first and second ones of the plurality of multiplexed data signals, respectively, and the first demultiplexed data signal includes a first signal crosstalk product related to an interaction among at least the first and second ones of the plurality of multiplexed data signals within the signal transmission medium; and processing the plurality of demultiplexed data signals and providing an output data signal corresponding to the first demultiplexed data signal and including a second signal crosstalk product corresponding to the first signal crosstalk product, wherein a ratio of the second signal crosstalk product and the output data signal is substantially less than another ratio of the first signal crosstalk product and the first demultiplexed data signal.

DETAILED DESCRIPTION OF THE INVENTION

Figure 1:
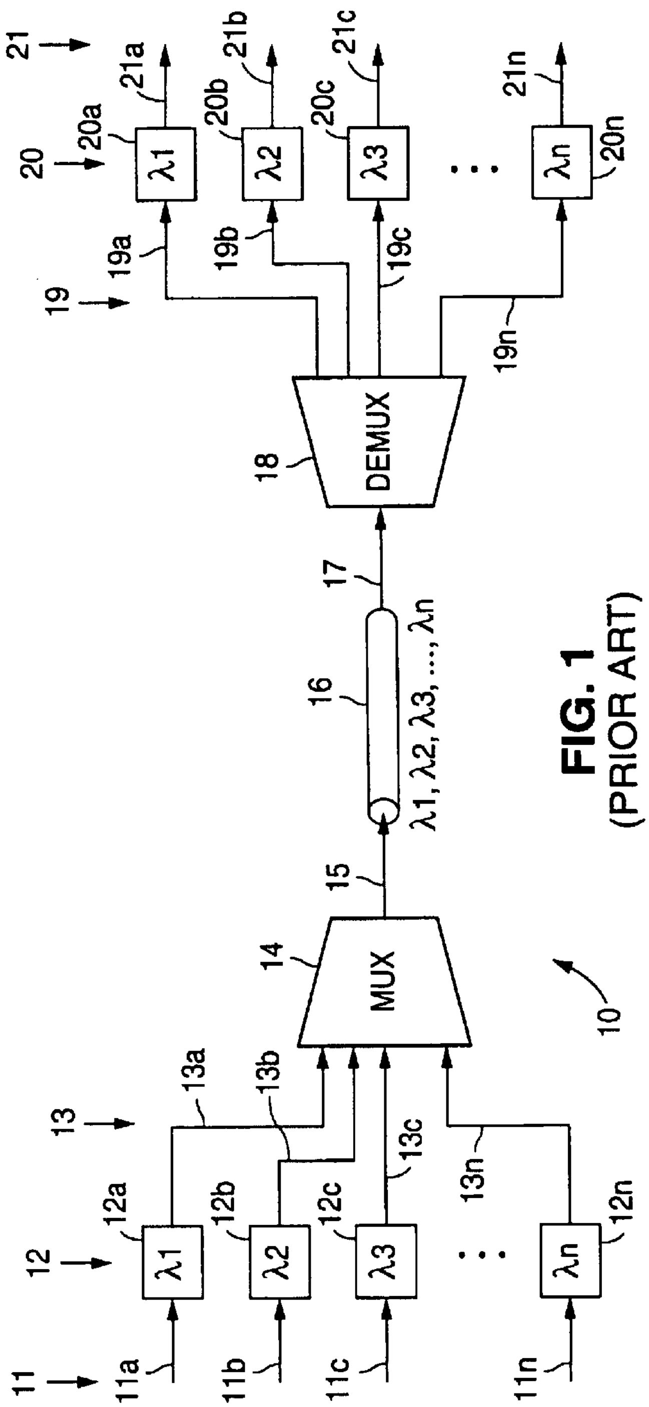
FIG. 1 is functional block diagram of a conventional fiber optic signal system.
Figure 2:
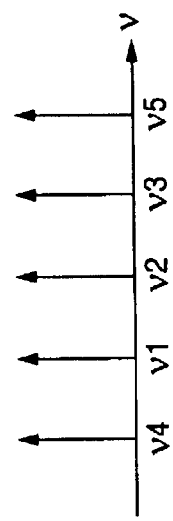
FIG. 2 is a graphical representation of a portion of the frequency spectrum in which four-wave mixing occurs.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are coupled together to provide the described function. Additionally, the term "signal" may refer to one or more currents, one or more voltages, or a data signal. Within the drawings, like or related elements will have like or related alpha, numeric or alphanumeric designators.

It should be further understood that throughout the following discussion example embodiments are discussed in which one or more data signals corresponding to adjacent or otherwise neighboring multiplexed data channels are described as being used or processed for compensating for signal crosstalk effects. It should be understood that, notwithstanding the specific examples provided, other numbers or multiples of adjacent or otherwise neighboring data signals can be used for the data signal processing as described without departing from the spirit or scope of the presently claimed invention.

In considering signal crosstalk effects in a WDM signal environment, we can assume the simple but prevalent binary no-return-to-zero (NRZ), on-off-keying (OOK) modulation format with direct detection (e.g., as opposed to multilevel modulation, coherent detection or subcarrier modulated systems). Thus, the transmit signal for channel l may be expressed as:

$$x^{(l)}(t) = \mathrm{Re}\left\{\sum_i A^{(l)} a_i^{(l)} h_T(t+iT)\cdot e^{j(\omega_c^{(l)}t+\phi_c^{(l)}(t))}\right\} = \mathrm{Re}\{\hat{x}^{(l)}(t)\}$$

where, $h_T(t)$ is the transmit pulse-shaping filter (normalized), $\{a_i^{(l)}\}$ is sequence of data symbols for channel l, $A^{(l)}$ is the intensity for channel l, $\phi^{(l)}(t)=\omega_c^{(l)}t+\phi_c^{(l)}(t)$ is the phase angle, with $\omega_c^{(l)}$ the carrier frequency and $$\frac{d\phi_c^{(l)}(t)}{dt}$$

the chirp (typically with direct modulators), $\hat{x}^{(l)}(t)$ is the corresponding complex signal.

We will successively consider how the signal is altered due to XPM, FWM and DWDM crosstalk. We generally ignore the effects of chromatic dispersion and polarization mode dispersion (PMD), as it will be assumed that these dispersion effects can be compensated elsewhere.

For Cross-Phase Modulation effects, consider some neighboring channel m, the transmit signal of which may be expressed as:

$$x^{(m)}(t) = \mathrm{Re}\left\{\sum_i A^{(m)} a_i^{(m)} h_T(t+iT)\cdot e^{j(\omega_c^{(m)}t+\phi_c^{(m)}(t))}\right\} = \mathrm{Re}\{\hat{x}^{(m)}(t)\}$$

In the presence of XPM and ignoring self-phase modulation (SPM) effects, the waveform $x^{(l)}(t)$ is modified due to $x^{(m)}(t)$, and may be expressed to a good approximation as (for common pulse shapes):

$$x^{(l)}(t) = \mathrm{Re}\left\{\sum_i A^{(l)} a_i^{(l)} h_T(t+iT)\cdot e^{j(\omega_c^{(l)}t+\phi_c^{(l)}(t))} e^{-jA^{(m)2}A^{(l)}\varphi\chi^{(3)}a_i^{(m)}h_T(0)h_T(\tau)}\right\}$$

where $\phi$ is a constant which linearly depends on length, $\chi^{(3)}$ is the $3^{rd}$ order nonlinear susceptibility, $\tau$ denotes the timing offset between channels l and m.

Note that XPM induces additional chirp which leads to higher dispersion penalties.

For Four-Wave Mixing effects, consider three neighboring channels m, n, p, such that $\omega^{(l)}=\omega^{(m)}+\omega^{(n)}-\omega^{(p)}$.

Four-wave mixing effects manifest as intrachannel crosstalk. The total crosstalk signal (i.e., additive distortion) for channel l due to the above three neighboring channels is then given by:

$$x_{CT}^{(l)}(t) = \mathrm{Re}\left\{\eta_{mnp}\sum_i A^{(m)}A^{(n)}A^{(p)}a_i^{(m)}a_i^{(n)}a_i^{(p)}h_T(t+iT+\tau^{(m)}) h_T(t+iT+\tau^{(n)})h_T(t+iT+\tau^{(p)})\cdot e^{j(\omega_c^{(l)}i+\phi(t))}\right\}$$

where $\eta_{mnp}$ denotes the product of the mixing efficiency and other parameters which are only a function of the channels m, n, p. Note that after the photodetector there will be additional cross terms between $x^{(l)}(t)$ and $x_{CT}^{(l)}(t)$.

For DWDM Crosstalk effects, different forms of crosstalk, both intrachannel and interchannel, may exist in a DWDM system. The sources of the crosstalk could be the cascaded wavelength multiplexing/demultiplexing (MUX/DEMUX), optical switch(es), as well as other elements. Ignoring other optical channel impairments, notably PMD, the input to the photodetector at the wavelength l due to crosstalk from the signal at wavelength m may be expressed in the following form:

$$x^{(l)}(t) = \mathrm{Re}\left\{\sum_i A^{(l)}a_i^{(l)}h(t+iT)\cdot e^{j(\omega_c^{(l)}t)} + \varepsilon\sum_i A^{(m)}a_i^{(m)}h(t+iT)\cdot e^{j(\omega_c^{(l)}t)}\right\}$$

where h(t) includes the effects of chromatic dispersion and $\epsilon$ is the crosstalk factor (which is a function of channel spacing). After passing through the photodetector, the output waveform can be expressed as:

$$s_e^{(l)}(t) = \left|\sum_i A^{(l)}a_i^{(l)}h(t+iT)\right|^2 + \varepsilon^2\left|\sum_i A^{(m)}a_i^{(m)}h(t+iT)\right|^2 + 2\varepsilon A^{(l)}A^{(m)}\sum_{i,k} a_i^{(m)}a_k^{(l)}h(t+iT)h(t+kT) + N(t)$$

This may be expanded to:

$$s_e^{(l)}(t) = \varepsilon\sum_{i,j} a_i^{(l)}a_j^{(m)}p_{i,j}^{(lm)}(t) + \varepsilon^2\sum_{i,j} a_i^{(m)}a_j^{(m)}p_{i,j}^{(m)}(t) + \sum_i a_i^{(l)}h^2(t+iT)$$

(where j=k) for appropriate waveforms $p_{i,j}^{(m)}(t)$ and $p_{i,j}^{(lm)}(t)$. (This equation will be referred to as the key DWDM crosstalk equation.) We have assumed that the third term above which may have substantial dispersion has been compensated elsewhere for dispersion effects. The other two terms are the crosstalk terms, each of a different nature which can be compensated by the presently claimed invention. If $\epsilon$ is small, the second term may be ignored.

Figure 3:
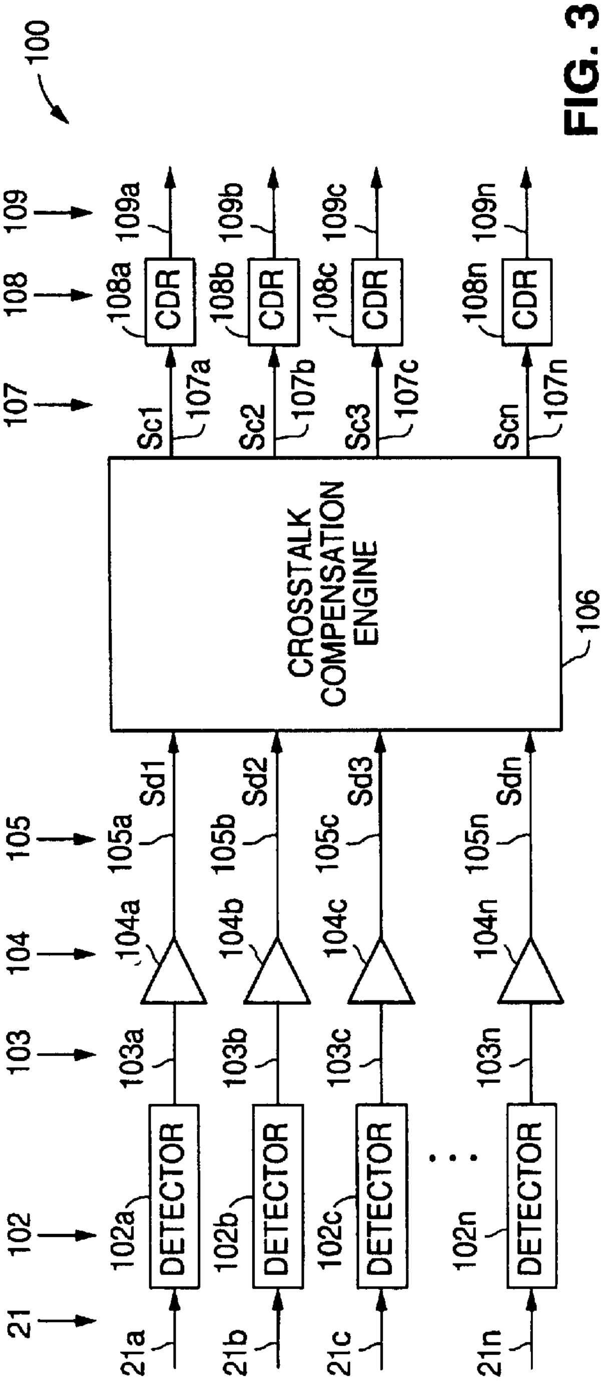
FIG. 3 is a functional block diagram of a portion of a multichannel optical signal receiver system with a crosstalk compensation engine in accordance with one embodiment of the presently claimed invention.

Referring to FIG. 3, a multichannel fiber optic signal receiving system 100 with a crosstalk compensation engine in accordance with one embodiment of the presently claimed invention uses a crosstalk compensation engine 106 within the signal paths for reducing signal crosstalk products related to interactions among the multiplexed data signals during conveyance via the fiber optic signal transmission medium 16 (FIG. 1). The incoming electrical data signals 21 are individually detected by a signal detection stage 102 having respective detector circuits 102*a*, 102*b*, 102*c*, . . . , 102*n* for each signal channel. The resulting detected signals 103 are buffered by a buffer amplifier stage 104. (Generally the respective output signals 103$a$, 103$b$, 103$c$, . . . , 103$n$ of the detector circuits 102$a$, 102$b$, 102$c$, . . . , 102$n$ are current signals and the respective buffer amplifiers 104$a$, 104$b$, 104$c$, . . . , 104$n$ are transimpedance amplifiers, thereby producing voltage signals as the respective buffered signals 105$a$, 105$b$, 105$c$, . . . , 105$n$.) The buffered signals 105$a$, 105$b$, 105$c$, . . . , 105$n$ (Sd1, Sd2, Sd3, . . . , Sdn) are processed by the crosstalk compensation engine 106 (discussed in more detail below). The compensated signals 107$a$, 10$b$, 107$c$, . . . , 107$n$ (Sc1, Sc2, Sc3, . . . , Scn) are further processed by clock and data recovery (CDR) circuits 108$a$, 108$b$, 108$c$, . . . , 108$n$ in accordance with well known techniques to produce the final data signals 109$a$, 109$b$, 109$c$, . . . , 109$n$ for further processing elsewhere in the system (not shown).

Figure 3B:
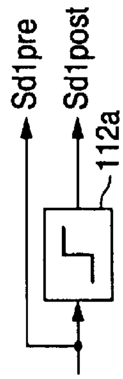
FIG. 3B is a functional block diagram of a signal slicer illustrating the availability of both "pre" and "post" slicer output signals for use in subsequent, or downstream, circuitry.
Figure 3A:
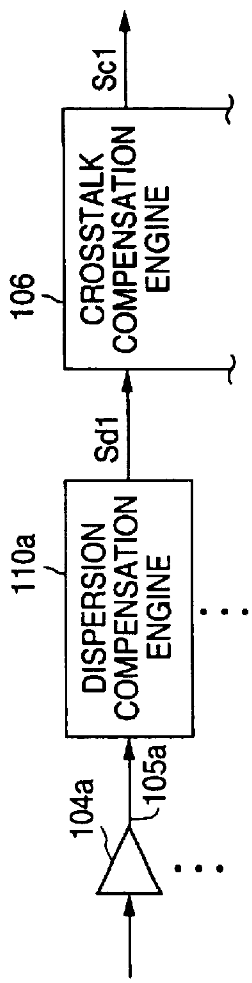
FIG. 3A is a functional block diagram representing a portion of the multichannel optical signal receiver system of FIG. 3 with the crosstalk compensation engine preceded by multiple dispersion compensation engines.

Referring to FIG. 3A, it will be appreciated that, as desired, each channel of the system 100 (FIG. 3) can include, interposed between the corresponding buffer amplifiers 104$a$, 104$b$, 104$c$, . . . , 104$n$ and the crosstalk compensation engine 106, respective dispersion compensation engines (DCEs) 110$a$, 110$b$, 110$c$, . . . , 110$n$ (with only the first amplifier 104$a$ and DCE 110$a$ actually depicted here). Accordingly, each of the input signals Sd1, Sd2, Sd3, . . . , Sdn to the crosstalk compensation engine 106 will be compensated to reduce intersymbol interference (ISI) products within each data signal caused by signal dispersion and nonlinearities within the signal transmission media. Examples of suitable DCEs can be found in copending, commonly assigned U.S. patent application Ser. No. 10/117,293, filed on Apr. 5, 2002, entitled "Compensation Circuit For Reducing Intersymbol Interference Products Caused By Signal Transmission Via Dispersive Media", and in copending, commonly assigned U.S. patent application Ser. No. 10/117,293, filed on even date herewith, entitled "Compensation Circuit For Reducing Intersymbol Interference Products Caused By Signal Transmission Via Dispersive Media", the disclosures of which are hereby incorporated by reference.

Referring to FIG. 3B, each DCE 110$a$, 110$b$, 110$c$, . . . , 110$n$ will have as part of its output stage a corresponding signal slicer 112$a$, 112$b$, 112$c$, . . . , 112$n$ (e.g., either fixed or adaptive, with only the first DCE output slicer 112$a$ actually depicted here). For example, for the first DCE output slicer 112$a$, available output signals include Sd1pre and Sd1post which are the "pre" and "post" slicer output signals, respectively, for use in subsequent, or downstream, circuitry such as the crosstalk compensation engine 106. As will be noted in more detail in context in the following discussion, these "pre" Sd1pre and "post" Sd1post slicer output signals are selectively used in the various embodiments of the presently claimed invention.

Notwithstanding the foregoing discussion, it should be understood that the circuitry providing the input signals Sd1, Sd2, Sd3, . . . , Sdn to the crosstalk compensation engine 106 need not necessarily be any particular type of compensation circuitry, such as the aforementioned DCEs. Regardless of what circuitry provides the input signals Sd1, Sd2, Sd3, . . . , Sdn to the crosstalk compensation engine 106, as will be noted in more detail in context in the following discussion, the "pre" and "post" slicer output signals from the final output slicer stage are selectively used in the various embodiments of the presently claimed invention.

For DWDM Crosstalk, we first handle mitigation of DWDM crosstalk using the key DWDM crosstalk equation. We denote the vector $b^{(m)}[k]$ with binary components to represent a suitably indexed form of $\{a_i^{(m)} \cdot a_j^{(m)}\}_{i,j}$ and the vector $b^{(lm)}[k]$ with binary components to represent a suitably indexed form of $\{a_i^{(l)} \cdot a_j^{(m)}\}_{i,j}$ as at time kT. Note that successive $b^{(m)}[k]$ or $b^{(lm)}[k]$ may be obtained by time-shifting the indices. Thus, we denote q=(i,j) with this ordering. Let the matrix $P^{(\cdot)}[q,t]$ denote the indexed form (using the same indexing form as above) of $\{\alpha_l(p_{i,j}^{(\cdot)}(t))\}_{i,j}$. Then we can express:

$$
\begin{aligned}
s_e(t) &= \underline{b}^{(l)T}\left[\left\lfloor \frac{t}{T} \right\rfloor\right] P^{(l)}[:,t] + \underline{b}^{(lm)T}\left[\left\lfloor \frac{t}{T} \right\rfloor\right] P^{(lm)}[:,t] + \\
&\quad \underline{b}^{(lm)T}\left[\left\lfloor \frac{t}{T} \right\rfloor\right] P^{(m)}[:,t] + N(t) \\
&= P\underline{b} + N(t)
\end{aligned}
$$

where,

[:,t] represents all rows (":") and only column t ("t"),

[[t/T]] is the integer portion only of the quotient t/T, and $$
\underline{b} = \begin{bmatrix} \underline{b}^{(l)} \\ \underline{b}^{(lm)} \\ \underline{b}^{(m)} \end{bmatrix}.
$$

Note that since $b^{(l)}$ is the desired bit stream, one approach for a crosstalk compensation engine in accordance with one embodiment of the presently claimed invention is to use an interference canceller.

Figure 4:
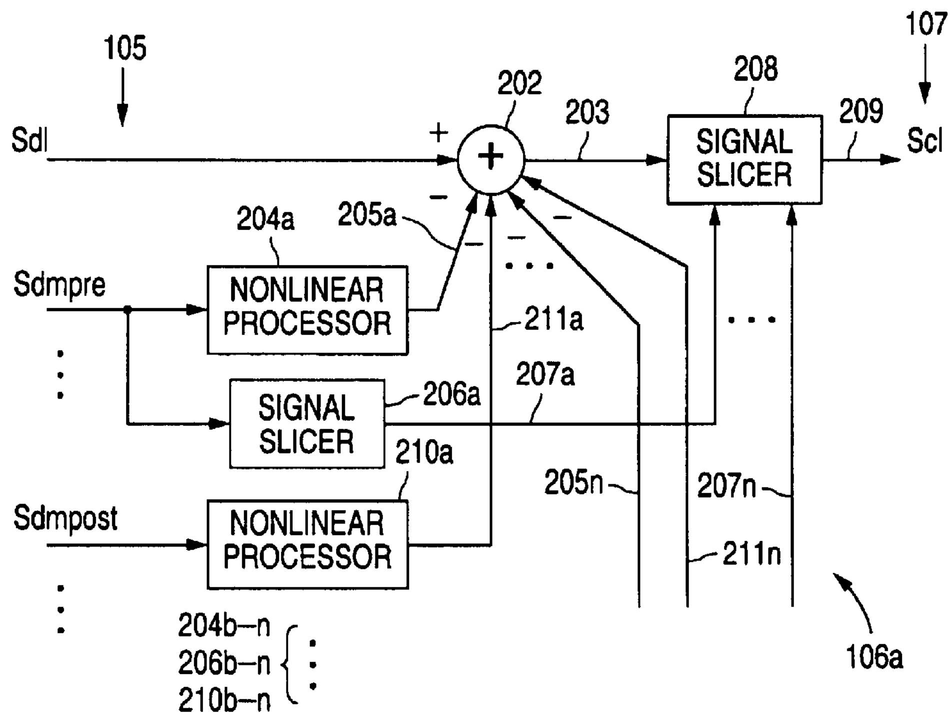
FIG. 4 is a functional block diagram of a crosstalk compensation engine for compensating for signal crosstalk effects resulting from DWDM in accordance with another embodiment of the presently claimed invention.

Referring to FIG. 4, a crosstalk compensation engine 106$a$ in accordance with one embodiment of the presently claimed invention compensates for signal crosstalk products related to signal interactions resulting from DWDM by canceling interference signals caused by adjacent data channels, and selectively includes a signal combiner 202, "pre" nonlinear signal processors 204$a$, 204$b$, 204$c$, . . . , 204$n$, input signal slicers 206$a$, 206$b$, 206$c$, . . . , 206$n$ "post" nonlinear signal processors 210$a$, 210$b$, 210$c$, . . . , 210$n$, and an output signal slicer 208, all interconnected substantially as shown. In conformance with the forgoing discussion, one or more processed signals 205$a$, 205$b$, 205$c$, . . . , 205$n$, and 211$a$, 211$b$, 211$c$, . . . , 211$n$ (discussed in more detail below) are subtracted in the signal combiner 202 from the data signal Sdl from the reference channel, i.e., the channel of interest. The resultant signal 203 is sliced by the output signal slicer 208 (discussed in more detail below) to produce the compensated reference data signal Scl.

In accordance with the presently claimed invention, the crosstalk compensation engine 106$a$ of FIG. 4 can be implemented to include various combinations of the "pre" nonlinear signal processors 204$a$, 204$b$, 204$c$, . . . , 204$n$, input signal slicers 206$a$, 206$b$, 206$c$, . . . , 206$n$, and "post" nonlinear signal processors 210$a$, 210$b$, 210$c$, . . . , 210$n$. For example, using only the first "pre" nonlinear signal processor 204$a$, input signal slicer 206$a$ and "post" nonlinear signal processor 210$a$ for purposes of illustration, the following combinations can be used with corresponding processed signals 205$a$, 211$a$ being subtracted in the signal combiner 202 from the reference data signal Sdl: the "dual combination" of "pre" nonlinear signal processor 204$a$ and input signal slicer 206$a$; the "post" nonlinear signal processor 210$a$ only; and the "triple combination" of "pre" nonlinear signal processor 204$a$, input signal slicer 206$a$ and "post" nonlinear signal processor 210$a$. In conformance with the discussion above for FIG. 3B, the input signal Sdmpre to the "pre" nonlinear signal processor 204$a$ and input signal slicer 206$a$ is the "pre" slicer output signal for adjacent channel "m", while the input signal Sdmpost to the "post" nonlinear signal processor 210$a$ is the "post" slicer output signal from the preceding circuitry (not shown). Further combinations will be evident as further "pre" nonlinear signal processors 204*b*, 204*c*, . . . , 204*n*, input signal slicers 206*b*, 206*c*, . . . , 206*n*, and "post" nonlinear signal processors 210*b*, 210*c*, . . . , 210*n* are used.

The processed signals 205*a*, 205*b*, 205*c*, . . . , 205*n* which are subtracted from the reference data signal Sdl are generated by nonlinearly processing (discussed in more detail below) the one or more data signals Sdmpre, Sdmpost from adjacent (e.g., in terms of multiplexed wavelength υ) data channels. The "pre" slicer data signals Sdmpre, . . . are also sliced by the input signal slicers 206*a*, 206*b*, 206*c*, . . . , 206*n*, with the resulting sliced data signals 207*a*, 207*b*, 207*c*, . . . , 207*n*, being used to control the output signal slicer 208 (which is then implemented as an adaptive signal slicer as discussed in more detail below) used to slice the resultant signal 203.

By selectively subtracting out the various nonlinearly processed signals 205, 211 (representing data signal components from adjacent data channels) from the incoming reference data signal Sdl, signal crosstalk products related to DWDM signal interactions between the reference data signal Sdl and adjacent channel data signal Sdm are compensated by being significantly reduced.

Figure 5:
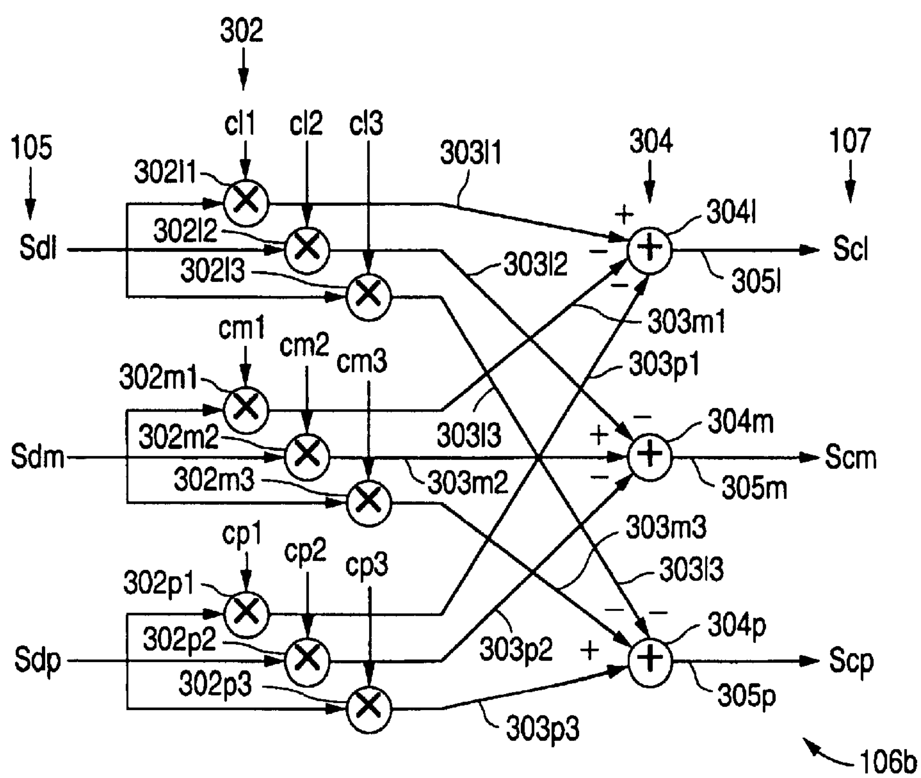
FIG. 5 is a functional block diagram of a crosstalk compensation engine for compensating for signal crosstalk effects resulting from DWDM in accordance with another embodiment of the presently claimed invention.

Referring to FIG. 5, a crosstalk compensation engine 106*b* in accordance with another embodiment of the presently claimed invention also compensates for signal crosstalk products related to signal interactions resulting from DWDM, and includes a signal multiplication stage 302 and a signal summing stage 304, interconnected substantially as shown. Incoming data signals 105, including the reference data signal Sdl and additional data signals Sdm, Sdp corresponding to adjacent data channels are multiplied in the signal multiplication stage 302. The data signals Sdl, Sdm, Sdp (preferably "pre" slicer data signals) are multiplied within respective signal multipliers 302l1, 302l2, 302l3, 302m1, 302m2, 302m3, 302p1, 302p2, 302p3 with corresponding adaptive coefficients Cl1, Cl2, Cl3, Cm1, Cm2, Cm3, Cp1, Cp2, Cp3. The resulting product signals 303l1, 303l2, 303l3, 303m1, 303m2, 303m3, 303p1, 303p2, 303p3 are distributed and selectively summed or subtracted together in the signal summing stage 304 (e.g., first product signals 303m1 and 303p1 are subtracted from first product signal 303l1 in the first signal summing element 304l.). The resulting signals 305l, 305m, 305p form the compensated data signals Scl, Scm, Scp.

By selectively scaling the incoming data signals Sdl, Sdm, Sdp and selectively subtracting out scaled data signal components corresponding to adjacent data channels, signal crosstalk products related to DWDM signal interactions between the reference data signal Sdl and adjacent channel data signals Sdm, Sdp are compensated by being significantly reduced.

Four-Wave Mixing Effects manifest as additive interference generated from the products of the interfering waveforms and product interference due to the square-law characteristic of the photodetector. Since the mixing efficiency of the four-wave mixing products substantially reduces as the interfering channels are farther away from the reference wavelength, it generally suffices to only consider the crosstalk effects due to the nearest channels only.

Figure 6:
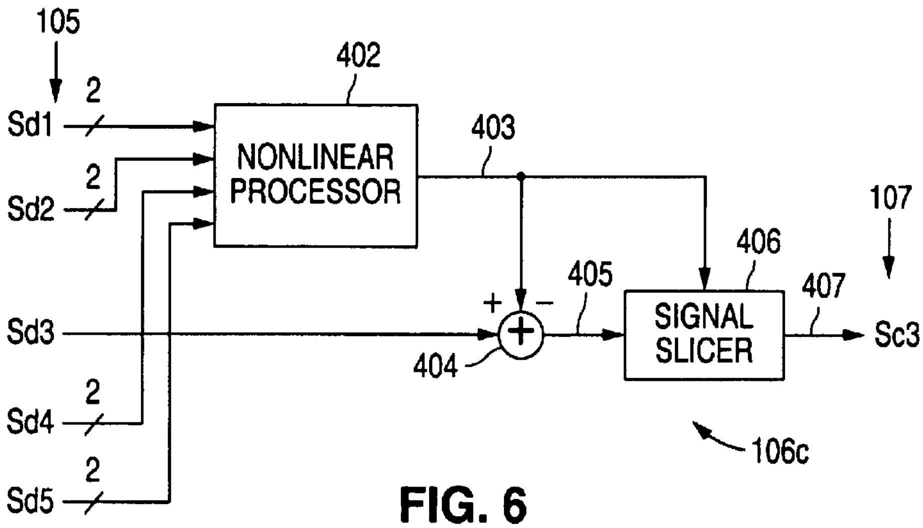
FIG. 6 is a functional block diagram of a crosstalk compensation engine for compensating for signal crosstalk effects resulting from FWM in accordance with still another embodiment of the presently claimed invention.

Referring to FIG. 6, a crosstalk compensation engine 106*c* in accordance with still another embodiment of the presently claimed invention compensates for signal crosstalk products resulting from FWM, and includes a product and gain processor 402, a signal combiner 404, and an adaptive signal slicer 406, all interconnected substantially as shown. Data signals Sd1, Sd2, Sd4, Sd5 from mutually adjacent data channels (preferably exclusive of the reference channel data signal Sd3) are processed by the product and gain processor 402 (discussed in more detail below). (Each data signal Sd1, Sd2, Sd4, Sd5 is actually a dual signal in that both "pre" and "post" slicer data signals are used.) The resulting processed signal 403 is subtracted from the data signal Sd3 from the reference data channel. The resultant signal 405 is sliced by the signal slicer 406 in accordance with the processed signal 403 which serves as its control signal (discussed in more detail below). The final sliced signal 407 provides the compensated data signal Sc3 of interest.

By selectively processing data signals Sd1, Sd2, Sd4, Sd5 from adjacent data channels, subtracting the resulting processed signal 403 from the reference data signals Sd3l, and adaptively slicing the resultant signal 405 (in accordance with the processed signal 403 representing data signal components from adjacent data channels), signal crosstalk products related to FWM signal interactions between the reference data signal Sd3 and adjacent channel data signals Sd1, Sd2, Sd4, Sd5 are compensated by being significantly reduced.

Cross-Phase Modulation manifests as additional chirp resulting in additional dispersion penalties.

Figure 7:
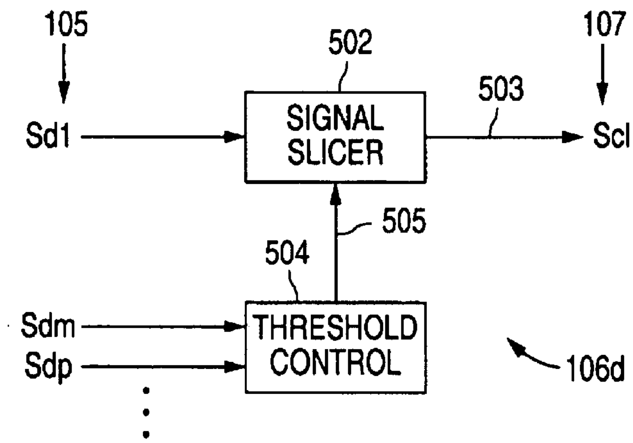
FIG. 7 is a functional block diagram of a crosstalk compensation engine for compensating for signal crosstalk effects resulting from XPM in accordance with yet another embodiment of the presently claimed invention.

Referring to FIG. 7, a crosstalk compensation engine 106*d* in accordance with yet another embodiment of the presently claimed invention is used for compensating for signal crosstalk products resulting from XPM, and includes an adaptive signal slicer 502 and a threshold controller 504, interconnected substantially as shown. The reference data signal Sdl (as a "pre" slicer data signal) is sliced by the adaptive signal slicer 502, with the resulting sliced data signal 503 providing the compensated reference data signal Scl. Data signals Sdm, Sdp (as "post" slicer data signals) corresponding to one or more adjacent multiplexed data channels are processed by the threshold controller 504 (e.g., a memory array or look up table) to provide the control signal 505 for the adaptive signal slicer 502.

By selectively processing data signals Sdm, Sdp from adjacent data channels and using the resultant processed signal 505 to adaptively control slicing of the reference data signals Sdl, signal crosstalk products related to XPM signal interactions between the reference data signal Sdl and adjacent channel data signals Sdm, Sdp are compensated by being significantly reduced.

Figure 8A:
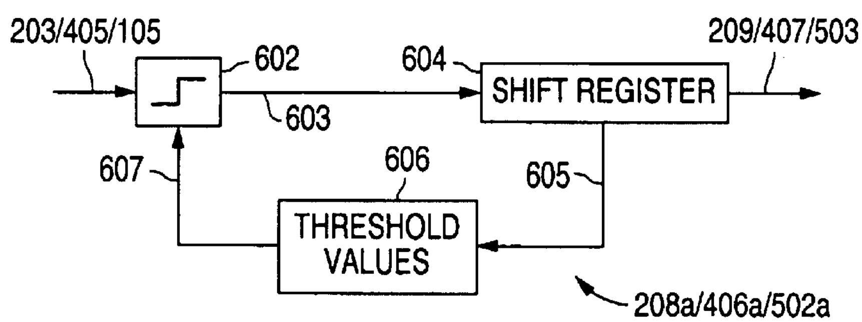
FIGS. 8A, 8B, 8C and 8D are functional block diagrams of examples of adaptive signal slicers suitable for use in the crosstalk compensation engines of FIGS. 4, 6, and 7.

Referring to FIG. 8A, one example of an adaptive signal slicer 208*a*/406*a*/502*a* suitable for use in the circuits of FIGS. 4, 6 and 7 has a slicing, or threshold, circuit 602 having a threshold which is controlled or provided by a threshold control signal 607 from a threshold value circuit 606. The sliced data 603 is provided to a shift register 604, the contents 605 of which are used to determine the threshold control signal 607 provided by the threshold value circuit 606. In one embodiment, this threshold value circuit 606 can be a memory circuit, such as a random access memory or lookup table, which uses the shift register output 605 as an address signal for selecting the appropriate output 607 for use as the threshold data or control signal.

Figure 8B:
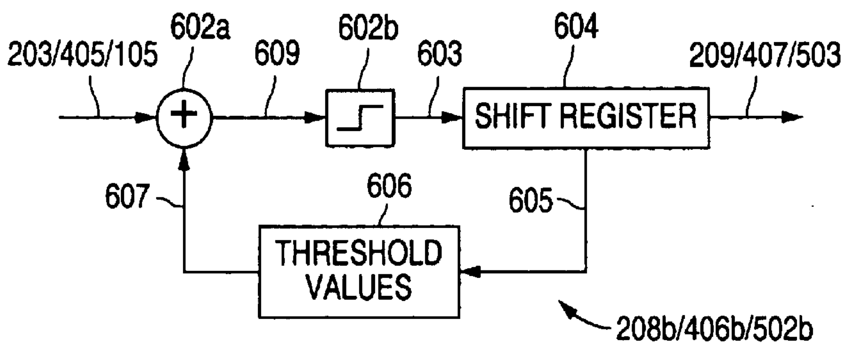

Referring to FIG. 8B, another example of an adaptive signal slicer 208*b*/406*b*/502*b* suitable for use in the circuits of FIGS. 4, 6 and 7 has a signal summing, or scaling, stage 602*a* in which the incoming signal 203/405/105 is summed, or scaled in accordance, with the threshold control signal 607 from the threshold value circuit 606. The scaled signal 609 is sliced by the slicing, or threshold, circuit 602*b* using a fixed threshold. As before, the sliced data 603 is provided to a shift register 604, the contents 605 of which are used to determine the threshold control signal 607 provided by the threshold value circuit 606. (Alternatively, in place of the scaling stage 602*a*, threshold control signal 607 and threshold value circuit 606, a variable gain stage, gain control signal and gain control circuit, respectively (not shown), can be used, whereby the variable gain stage would amplify or attenuate the incoming signal 203/405/105 in accordance with the gain control signal provided by the gain control circuit.)

Figure 8C:
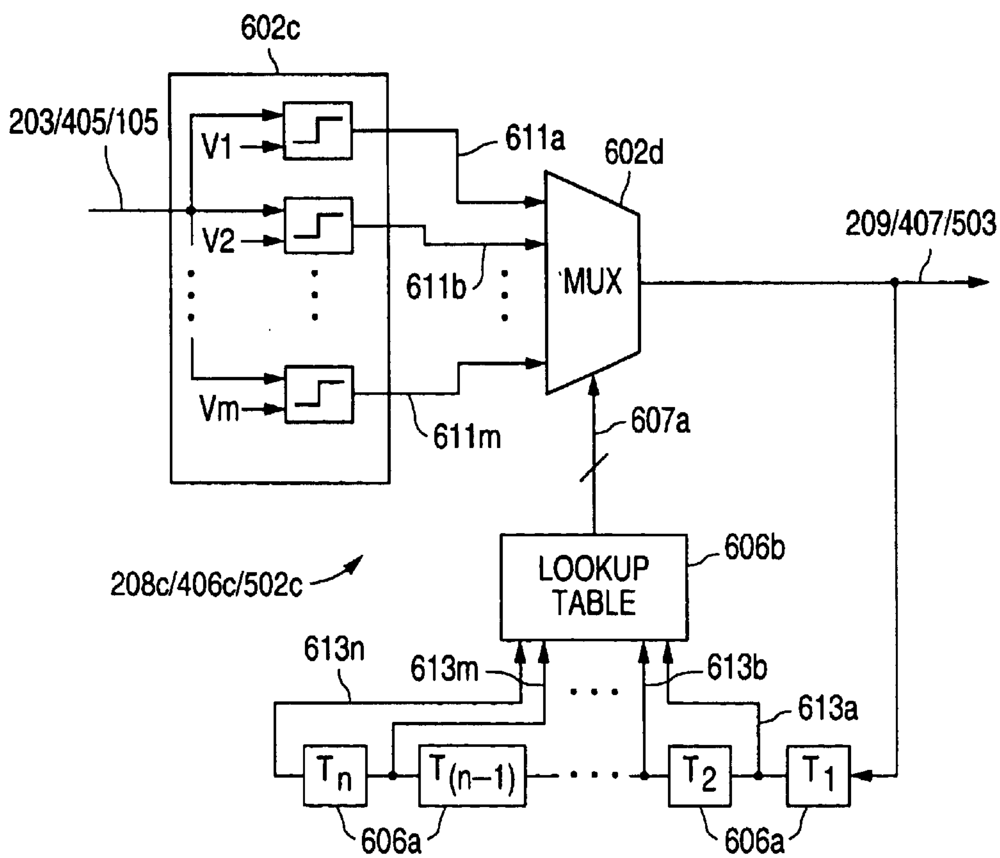

Referring to FIG. 8C, still another example of an adaptive signal slicer 208*c*/406*c*/502*c* suitable for use in the circuits of FIGS. 4, 6 and 7 has a multiple-level (e.g., m levels) slicer 602*c* in which the incoming signal is compared against m thresholds V1, V2, V3, . . . , Vm, with one of the m sliced signals 611*a*, 611*b*, . . . , 611*m* selected by a multiplexor 602*d*. The output 209/407/503 of the multiplexor 602*d* is sequentially delayed by a number of delay elements 606*a* (e.g., a shift register), with the resultant delayed signals 613*a*, 613*b*, . . . , 613*n* used to address a memory element (e.g., a lookup table) 606*b*, the output 607*a* of which controls the multiplexor 602*d*.

Figure 8D:
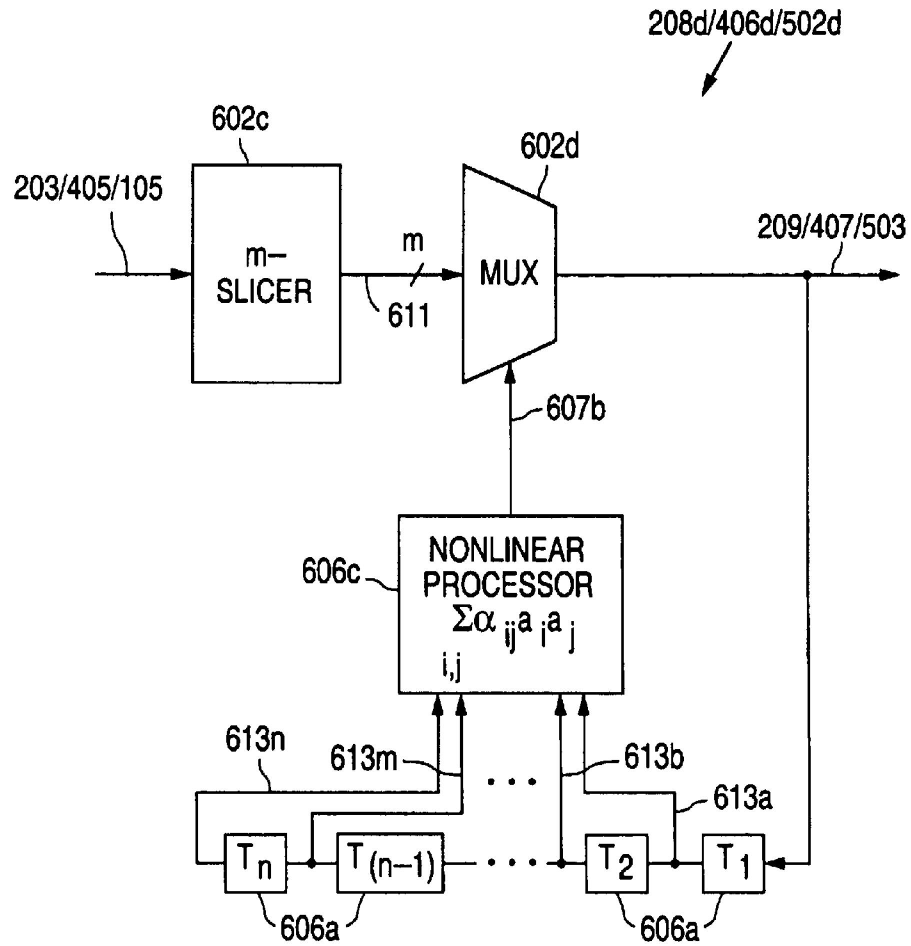

Referring to FIG. 8D, yet another example of an adaptive signal slicer 208*d*/406*d*/502*d* suitable for use in the circuits of FIGS. 4, 6 and 7 also has the multiple-level slicer 602*c* and multiplexor 602*d*. In this circuit 208*d*/406*d*/502*d*, the delay elements 606*a* in cooperation with a nonlinear processor 606*c* use the delayed signals 613*a*, 613*b*, . . . , 613*n* to produce a sum of products, the result 607*b* of which controls the multiplexor 602*d*.

Figure 8E:
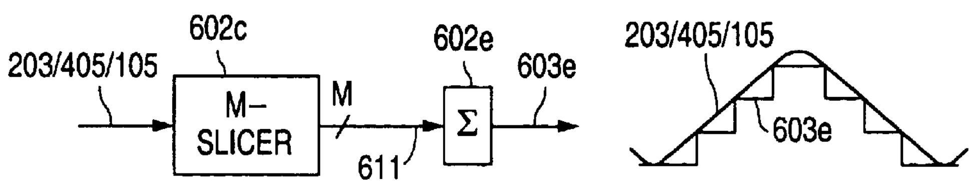
FIG. 8E is a functional block diagram of a use of the multiple-level slicers of the signal slicers of FIGS. 8C and 8D to provide a multiple-level sliced output signal.

Referring to FIG. 8E, an analog implementation in which a multiple-level sliced signal is desired sums the m-output slice signals 611 from the multiple-level slicers 602*c* (FIGS. 8C and 8D) with analog signal summing circuitry 602*e* to produce a multiple-level analog signal 603*e*. For example, as shown, where the incoming signal 203/405/105 is a sine wave and m=4, the output signal 603*e* will have four discrete levels.

Figure 8F:
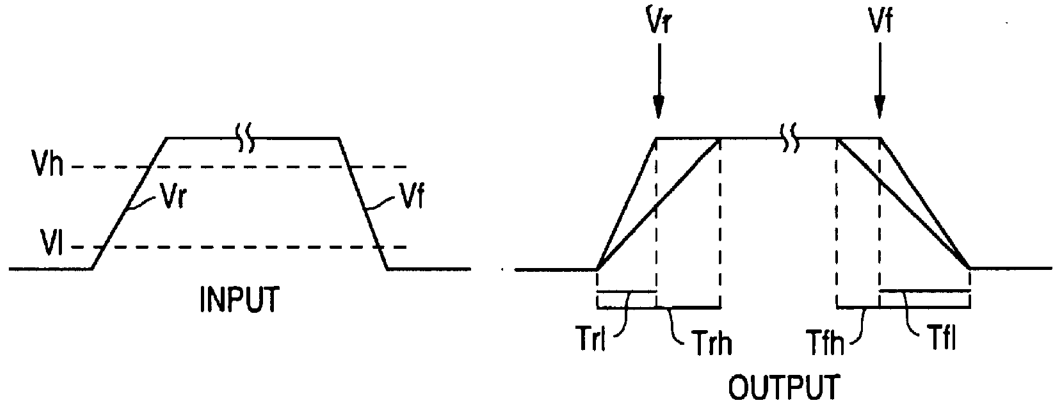
FIG. 8F illustrates graphical representations of how the adaptive signal slicers of FIGS. 8A, 8B, 8C and 8D can be implemented to selectively control the slicing thresholds for the input signal and the rise and fall times for the output signal.

Referring to FIG. 8F, the adaptive signal slicers 208*a*/406*a*/502*a*, 208*b*/406*b*/502*b*, 208*c*/406*c*/502*c*, 208*d*/406*d*/502*d* of FIGS. 8A, 8B, 8C and 8D can be implemented to allow selective control of the slicing thresholds for the input signal and the rise and fall times for the output signal, as well as the differences between them thereby allowing hysteresis to be introduced in terms of slicing thresholds, rise and fall times, or both. For example, based upon the adaptive signal slicer architectures as depicted, it will be appreciated that the slicing thresholds for the input signal can be selectively controlled such that the respective slicing thresholds for the rising Vr and falling Vf portions of the input signal can be individually selected to be anywhere within the available lower Vl and upper Vh limits. Slicing threshold hysteresis can be introduced by making such slicing thresholds different. Similarly, the rise and fall times for the output signal can be selectively controlled such that the rise Tr and fall Tf times for the rising Vr and falling Vf portions of the output signal can be selected to be anywhere within the available lower Trl, Tfl and upper Trh, Tfh limits. Rise and fall time hysteresis can be introduced by making such rise and fall times different.

Figure 9A:
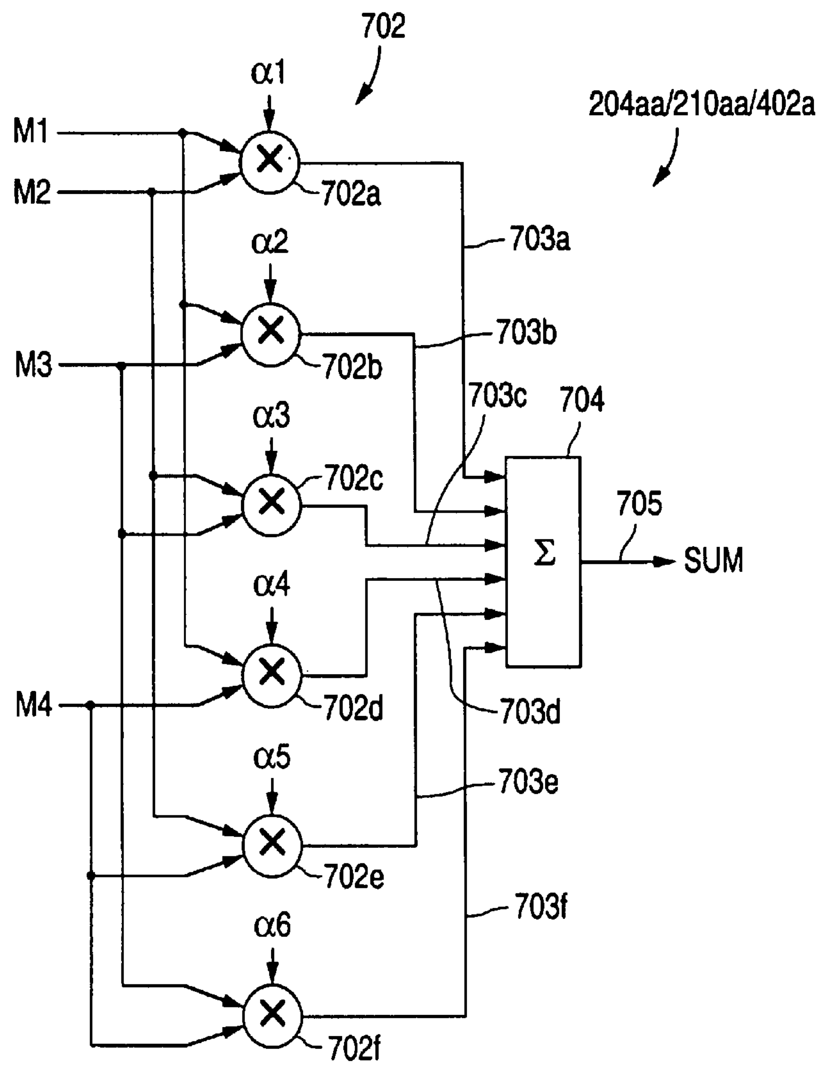
FIGS. 9A and 9B are functional block diagrams of examples of nonlinear signal processors suitable for use in the crosstalk compensation engine of FIGS. 4 and 6.

Referring to FIG. 9A one example of a nonlinear signal processing circuit 204*aa*/210*aa*/402*a* suitable for use as the nonlinear signal processors in the circuits of FIGS. 4 and 6 include multiplier circuitry 702 for generating product signals 703, and a summing circuit 704 for summing such signal products 703. In this particular example, there are four input, or multiplicand, signals M1, M2, M2, M4. In this example, the inputs M1, M2, M3, M4 are multiplied in pairs in the respective multipliers 702*a*, 702*b*, 702*c*, 702*d*, 702*e*, 702*f*, while also being scaled by corresponding scaling coefficients α1, α2, α3, α4, α5, α6. The resulting scaled products 703*a*, 703*b*, 703*c*, 703*d*, 703*e*, 703*f* are summed in the summing circuitry 704 to produce the sum output 705.

Figure 9B:
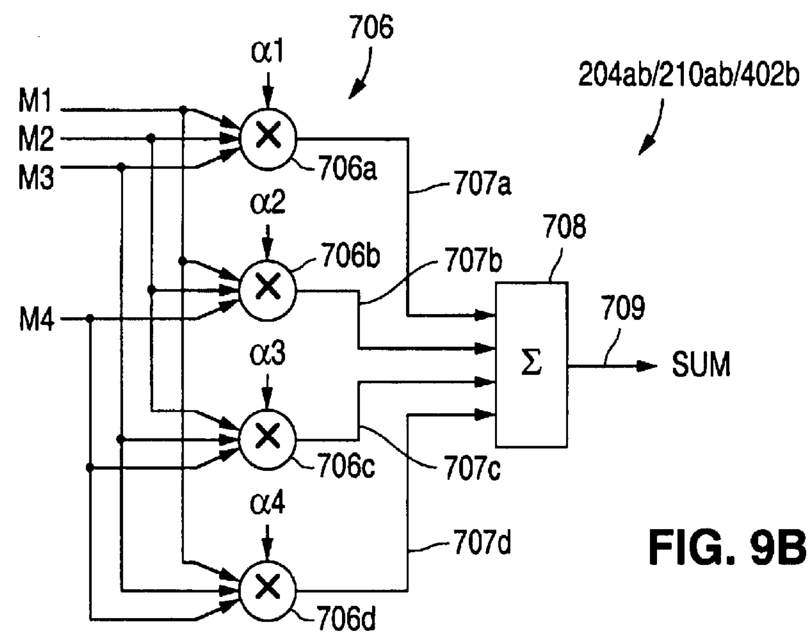

Referring to FIG. 9B, another example of a nonlinear signal processing circuit 204*ab*/210*ab*/402*b* suitable for use as the nonlinear signal processors in the circuits of FIGS. 4 and 6 also include multiplier circuitry 706 and summing circuitry 708. In this example, the four inputs M1, M2, M3, M4 are multiplied in groups of three and scaled by corresponding scaling coefficients α1, α2, α3, α4 in respective multipliers 706*a*, 706*b*, 706*c*, 706*d*. As before, the resultant products 707*a*, 707*b*, 707*c*, 707*d* are summed in the summing stage 708 to produce the sum output 709.

As will be readily understood, when either of these circuits 204*aa*/210*aa*/402*a*, 204*ab*/210*ab*/402*b* is used for the nonlinear processor of the circuit 106*c* of FIG. 6, the input multiplicands M1, M2, M3, M4 will correspond to the adjacent channel signals Sd1, Sd2, Sd4, Sd5 (with two each of such circuit 204*aa*/210*aa*/402*a*, 204*ab*/210*ab*/402*b* needed to multiply both "pre" and "post" signal versions of the channel signals Sd1, Sd2, Sd4, Sd5). Alternatively, if either of these circuits 204*aa*/210*aa*/402*a*, 204*ab*/210*ab*/402*b* is used for the nonlinear processors of the circuit of FIG. 4, the input multiplicands M1, M2, M3, M4 (which may be of a quantity other than four) each will be successive, time-delayed versions of a single input signal. For example, for the first nonlinear processor 204*a* of the circuit 106*a* of FIG. 4, multiplicand M1 will be the input signal Sdmpre, while the remaining multiplicands M2, M3, M4 will be subsequent, successively time-delayed versions of such input signal Sdmpre.

It is further possible to apply suboptimal or "blind" approaches to compensation for interchannel crosstalk and/or jitter without requiring demodulation or demultiplexing of multiple wavelength signals received via the transmission medium. Such approaches may be described as "quasi" crosstalk compensation since only the reference channel data is used to make tentative decisions concerning interference from adjacent channel signals. Such tentative decisions, essentially inferences about possible adjacent channel data, are used for estimating and canceling crosstalk due to such adjacent channels and/or controlling one or more parameters for the signal slicers for the reference data channel for improving data recovery notwithstanding increased timing jitter due to interference from such adjacent channels.

Figure 10:
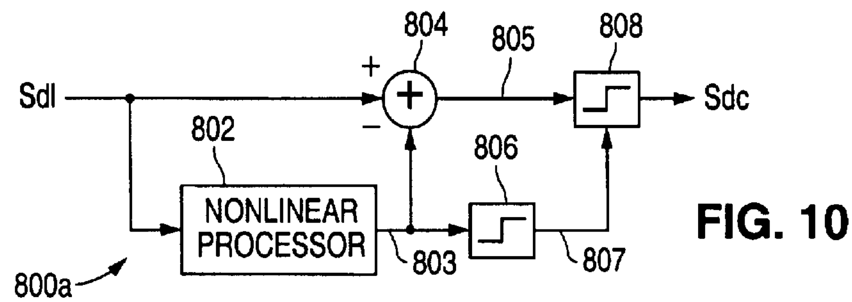
FIG. 10 is a functional block diagram of a "quasi" crosstalk compensation engine for compensating for signal crosstalk effects resulting from DWDM, FWM or XPM in accordance with the present invention.

Referring to FIG. 10, one example of a "quasi" crosstalk compensation engine 800*a* in accordance with another embodiment of the presently claimed invention compensates for signal crosstalk related to signal interactions resulting from DWDM, FWM or XPM, and includes a nonlinear processor 802, a signal combiner 804, a control signal slicer 806 and a data signal slicer 808, interconnected substantially as shown. The incoming reference channel data Sdl is processed by the nonlinear processor 802 (which can be implemented in conformance with the discussion above concerning FIGS. 9A and 9B). The resultant signal 803 is subtracted from the original data signal Sdl in the signal combiner 804. That resultant signal 805 is then sliced by the data slicer 808 in accordance with its control signal 807 (such an adaptive signal slicer can be implemented in accordance with the foregoing discussion concerning FIGS. 8A–8F). This control signal 807 is generated by slicing the nonlinearly processed signal 803 using the control signal slicer 806 (preferable a fixed slicer).

Accordingly, the nonlinear processor 802 processes the incoming data signal Sdl to produce a compensation signal 803 representing inferences about crosstalk contained within the reference data signal Sdl caused by interactions with adjacent channel signals. By subtracting this signal 803 from the reference data signal Sdl, such crosstalk products are substantially removed. Further, by using this processed signal 803, as further processed by the control signal slicer 806, to control the signal slicing parameters of the output data signal slicer 808, performance degradations caused by timing jitter due to interference from the adjacent channel signals is reduced.

Figure 11:
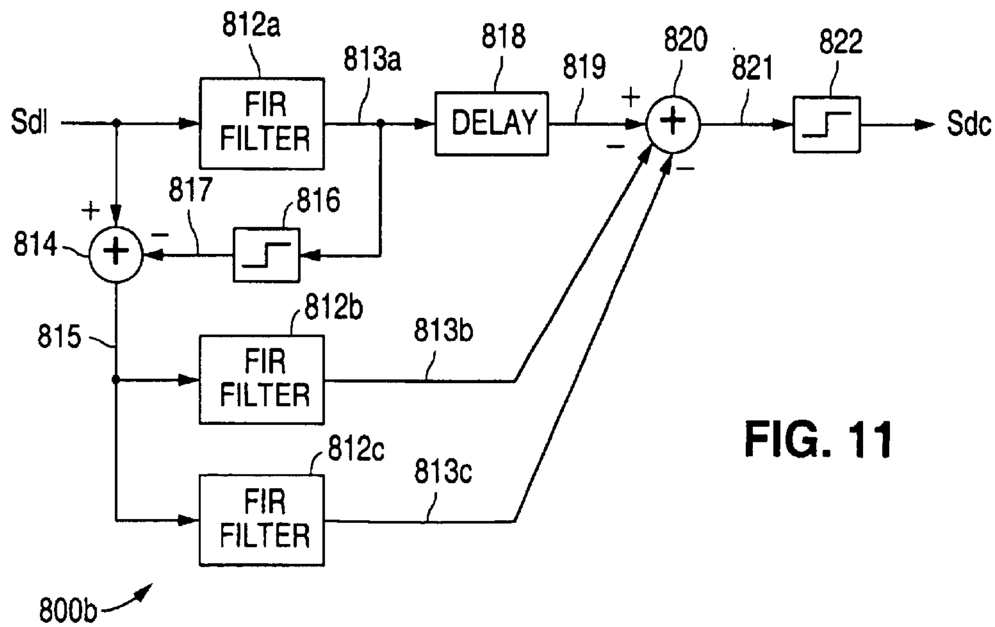
FIG. 11 is a functional block diagram of another "quasi" crosstalk compensation engine for compensating for signal crosstalk effects resulting from DWDM, FWM or XPM in accordance with the present invention.

Referring to FIG. 11, another example of a "quasi" crosstalk compensation engine 800*b* in accordance with another embodiment of the presently claimed invention compensates for signal crosstalk related to signal interactions resulting from DWDM, FWM or XPM, also by using only the reference channel data to draw inferences about crosstalk products induced by adjacent channels. This engine 800*b* includes multiple finite impulse response (FIR) filters 812*a*, 812*b*, 812*c*, an input signal combiner 814, a feedback signal slicer 816, a delay element 818, an output signal combiner 820 and an output signal slicer 822, all interconnected substantially as shown. As depicted, the incoming reference channel data signal Sdl is filtered by the first FIR filter 812*a*. The filtered signal 813*a* is sliced by the feedback signal slicer 816 and delayed by the delay element 818 (e.g., one or more flip-flops or registers, or a shift register). The sliced feedback signal 817 is subtracted from the incoming data signal Sdl in the signal combiner 814. The resultant signal 815 is filtered by the remaining FIR filters 812*b*, 812*c*. The resultant filtered signals 813*b*, 813*c* are subtracted from the delayed signal 819 in the output signal combiner 820. The resultant signal 821 is sliced by the output signal slicer 822.

Figure 12A:
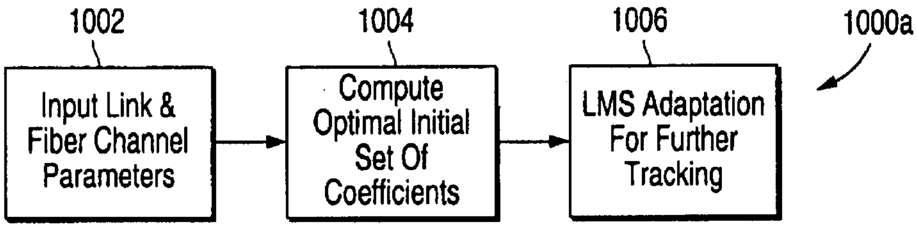
FIGS. 12A–12D illustrate techniques for computing and converging upon values for adaptive coefficients.

Referring to FIG. 12A, in reference to the discussion above concerning the use of adaptive coefficients for scaling the incoming signals, one technique 1000*a*, which may be described as an input data-aided technique, has three basic steps. The first step 1002 involves the input, or entry, of link and fiber channel parameters used to describe the signal transmission path. In the next step 1004, an initial set of coefficients deemed to be optimal is computed. Following that in step 1006, a least-mean-square (LMS) adaptation is performed to compute the final set of adaptive coefficients.

Figure 12B:
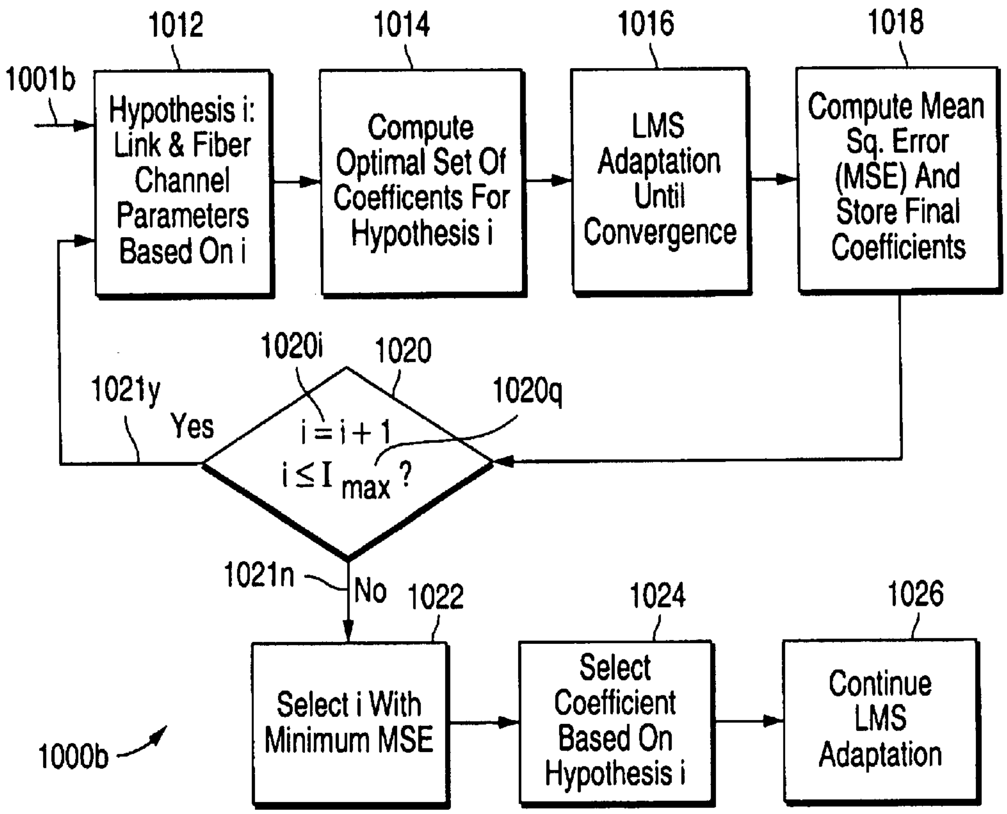

Referring to FIG. 12B, another technique 1000*b* may be described as a "blind" optimized technique. Starting with an initial hypothesis i 1001*b* concerning the parameters of the signal transmission path, the first step 1012 involves input, or entry of the link and fiber channel parameters based on such hypothesis i.

Following that in step 1014, an optimal set of coefficients for that hypothesis i is computed. Next, in step 1016, an LMS adaptation is performed until convergence of the values is achieved. Following that in step 1018, the mean-square error (MSE) for such coefficients is computed and stored for later use. Next, in step 1020, the next hypothesis i is selected 1020*i* and a query is made 1020*q* as to whether further hypotheses exist. If the answer 1021*y* is yes, the foregoing steps 1012, 1014, 1016, 1018 are repeated. If the answer 1021*n* is no, all hypotheses have been tested and, in the next step 1022, the hypothesis i with the minimum MSE is selected. Following this selection, in the next step 1024 the converged values of the adaptive coefficients corresponding to the selected hypothesis i are selected and, in the last step 1026, further LMS adaptation is performed on such selected values.

Figure 12C:
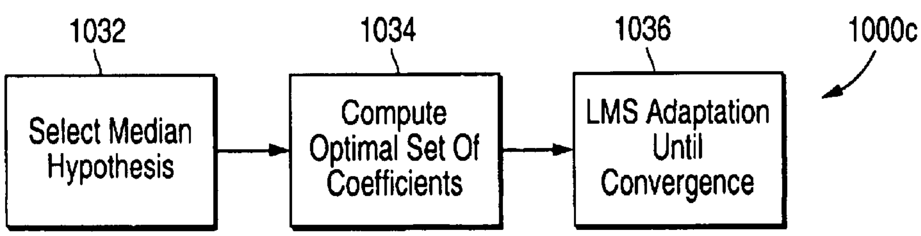

Referring to FIG. 12C, another technique 1000*c* can be described as a "blind" suboptomized technique. The first step 1032 involves selection of a median hypothesis concerning the parameters of the signal transmission path (e.g., link and fiber channel parameters). In the next step 1034, an optimal set of coefficients is computed based on such hypothesis. In the last step 1036, LMS adaptation of such coefficients is performed until their values converge.

Figure 12D:
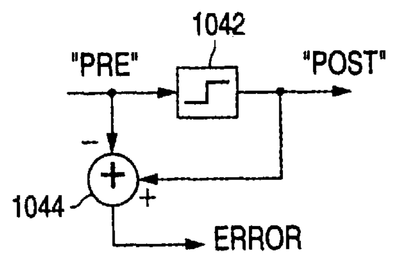

Referring to FIG. 12D, it should be understood that in performing the LMS adaptations of the adaptive coefficients (which is done in accordance with well known conventional techniques) the error parameter that is used is the difference between the output of the final signal slicer and its input. For example, as depicted, for the error associated with a final data output signal, the input "pre" of the final output data slicer 1042 is subtracted in a combiner 1044 from the output "post" of such data slicer 1042. This difference represents the subject error.

Figure 13:
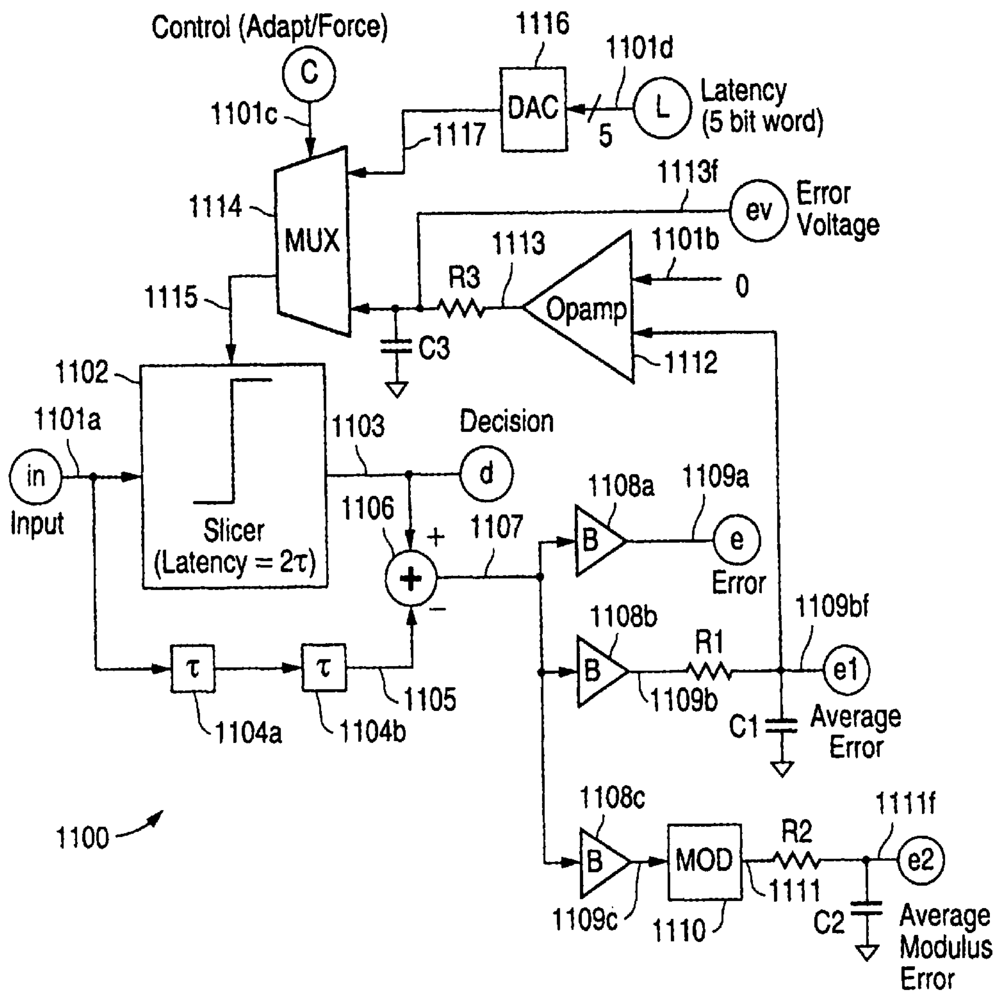
FIG. 13 is a functional block diagram of signal slicer circuitry in which the latency of the data slicer is controllable.

Referring to FIG. 13, the latencies of the data signal slicers discussed above can be controlled using circuitry 1100 substantially as shown. The data input signal 1101*a* is sliced by the data signal slicer 1102, as well as conveyed and delayed by one or more delay elements 1104. The resulting delayed data signal 1105 is subtracted from the sliced data signal 1103 in a signal combiner 1106. The resultant signal 1107 is buffered by three buffer amplifiers 1108*a*, 1108*b*, 1108*c*.

The first buffered signal 1109*a* forms the error signal (which may be used in computing the adaptive coefficients, as discussed above). The second buffered signal 1109*b* is low pass filtered (e.g., low pass filter R1-C1) to produce an average error signal 1109*bf*. The third buffered signal 1109*c* is processed by modulus circuitry 1110 with the resultant modulus signal 1111 then low pass filtered (e.g., low pass filter R2-C2) to produce an average modulus error signal 1111*f*.

The average error signal 1109*bf* is compared in a differential amplifier 1112 with a reference signal 1101*b* (e.g., zero volts). The resultant difference signal 1113 is low pass filtered (e.g., low pass filter R3-C3) to produce an error voltage signal 1113*f*.

Latency control data 1101*d* (e.g., a five-bit word) is received and converted to an analog signal by a digital-to-analog converter (DAC) 1116. The analog latency control signal 1117 and the error voltage signal 1113*f* are selectively routed, e.g., via a multiplexer 1114, in accordance with a routing control signal 1101*c*. The selected signal 1115 (either the latency control signal 1117 or error voltage signal 1113*f*) is used to control the latency within the data slicer 1102.

Due to the closed loop nature of this circuitry 1100, when the error voltage signal 1113*f* is selected for use as the control signal 1115 for the latency of the data slicer 1102, such data slicer latency is maintained equal to the cumulative delay of the one or more external delay elements 1104 (in this example, two data symbol periods 2τ. Alternatively, if a specific latency is desired, the latency control signal 1101*d* can be selected for establishing latency within the data slicer 1102 different from the cumulative delay of the delay elements 1104.

As will be readily understood by those of ordinary skill in the art, the individual circuit elements and functions discussed herein are well known and understood, and can be readily constructed and practiced in numerous ways using either analog or digital implementations as well as combinations of both. For example, analog implementations of the nonlinear signal processing circuits 204*a*, 204*b* of FIGS. 9A and 9B could use well known Gilbert cell circuitry for the multipliers 702, 714, simple voltage summing circuitry for the adders 704, 716, and passive filters (with substantially constant group delay) for the delay elements 712. Digital implementations of these circuits 204*a*, 204*b* could use well known combinations of binary registers and counters for the multipliers 702, 714, combinations of binary logic circuits for the adders 704, 716, and binary shift registers or flip flops for the delay elements 712.

Figure 14A:
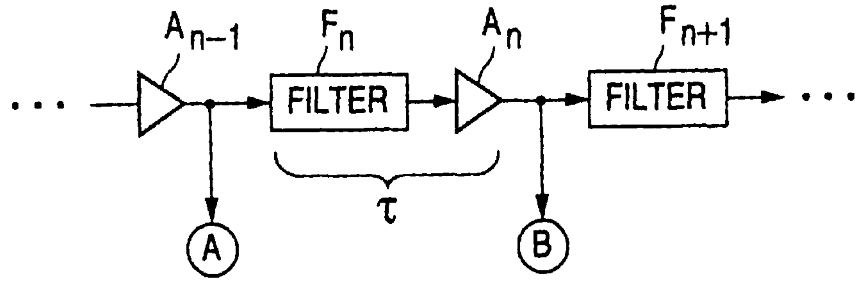
FIGS. 14A–14E are schematic diagrams depicting possible analog implementations for various circuit functions used in crosstalk compensation engines in accordance with embodiments of the presently claimed invention.

Referring to FIG. 14A, for example, analog circuitry suitable for use as the delay elements discussed above can be implemented, in accordance with well known conventional techniques, by a sequence of filters F and amplifiers A connected in series as shown. As is well known, each delay element would include a filter $F_n$ followed by a buffered amplifier $A_n$ This combination of elements $F_n$, $A_n$ will be designed to have a delay such that the signal appearing at point B will appear as the signal at point A but delayed by a time interval $\tau$, e.g., one data symbol period.

Figure 14B:
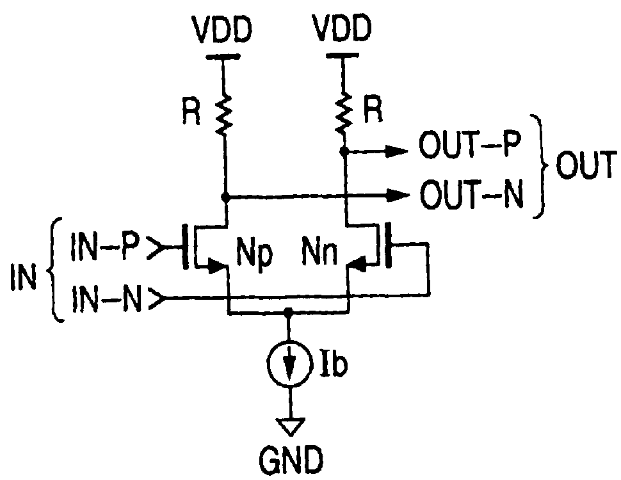

Referring to FIG. 14B, the analog amplifiers A can be implemented as conventional differential amplifiers where the input signal IN and output signal OUT are differential signals. The positive IN-P and negative IN-N phases of the input signal IN are applied to the gate terminals of the differentially connected NMOS transistors Np, Nn which are biased by a tail bias current source Ib. The positive OUT-P and negative OUT-N phases of the output signal OUT appear at the drain terminals of the transistors Nn, Np.

Figure 14C:
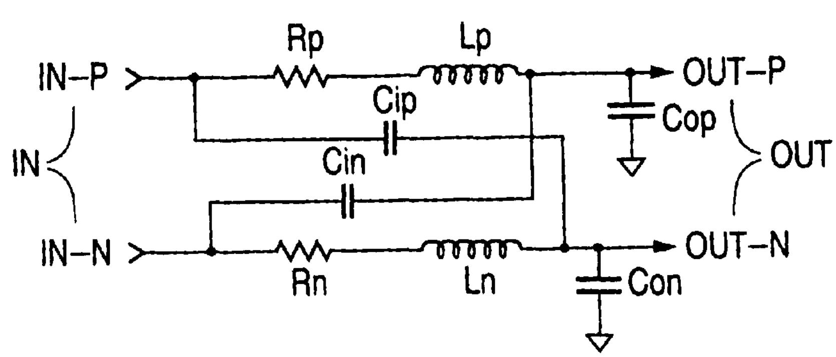

Referring to FIG. 14C, the filters F can be implemented as bridge RLC filters in accordance with well known techniques. The resistive inductive circuits Rp-Lp, Rn-Ln between the corresponding positive signal phase terminals IN-P, OUT-P and negative signal phase terminals IN-N, OUT-N in conjunction with the cross-coupled capacitors Cip, Cin and output shunt capacitors Cop, Con cause the signal appearing at the input IN to appear at the output OUT in a time-delayed but otherwise substantially unchanged form.

Figure 14D:
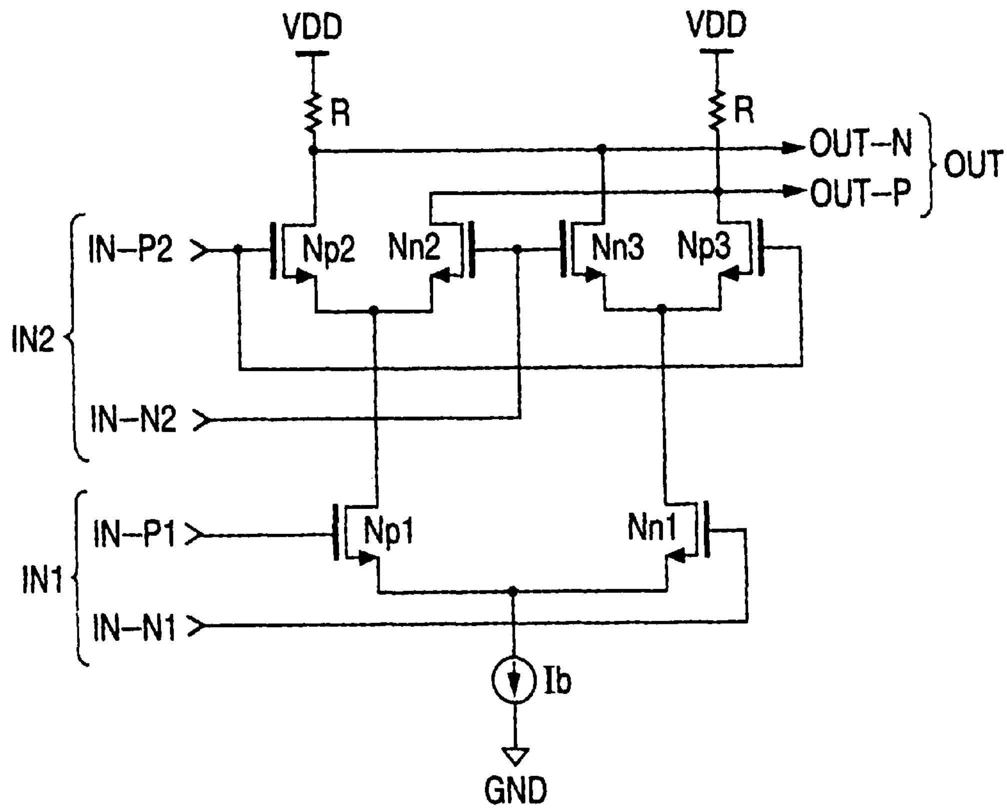

Referring to FIG. 14D, an analog circuit implementation for the multiplier circuitry discussed above can be implemented in accordance with well known techniques using telescopically connected differential amplifiers. The first input signal IN-1 has its positive IN-P1 and negative IN-N1 signal phases applied to the differentially connected NMOS transistors Np1, Nn1 which are biased by a tail bias current source Ib. The resulting drain currents of these transistors Np1, Nn1 serve as tail signal currents for the differentially connected NMOS transistors Np2, Nn2, Np3, Nn3 which are driven by the positive IN-P2 and negative IN-N2 signal phases of the second input signal IN2. The resulting drain currents of these transistors Np2, Nn2, Np3, Nn3 sum in the load resistors R to produce the differential signal phases OUT-P, OUT-N of the output signal OUT.

Figure 14E:
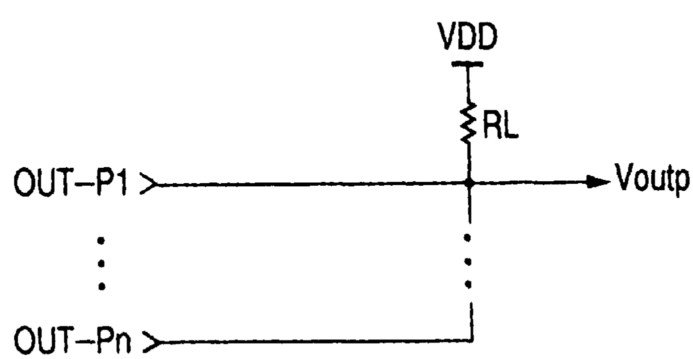

Referring to FIG. 14E, an analog circuit implementation of the signal combining, or summing, circuitry discussed above can be implemented in accordance with well known techniques by connecting the output signal phases of the multiplier circuitry to a common load resistor RL. For example, as shown, for the positive signal phases OUT-P1, . . . , OUT-Pn of a number n of the multiplier output signals are connected together to drive the load resistor RL. As more output signals become active, greater current is drawn through the load resistor RL thereby producing different values for the output voltage Voutp.

As will be further understood, while the present invention has been discussed in the context of implementations using discrete electronic circuitry (preferably in the form of one or more integrated circuit chips), the functions of any part of such circuitry may be implemented using one or more appropriately programmed processors, depending upon the data symbol rates to be processed.

As will be still further understood, while the present invention has been discussed in the context of the detection of signals received via signal transmission media in the form of optical fiber, the compensation principles and techniques discussed herein are also applicable to and useful for the detection of signals received via other forms of signal transmission media, including but not limited to wireless, conductive (e.g., metallic) materials or mixed media involving various combinations of wireless, conductive or optical media. Furthermore, the compensation principles and techniques discussed herein are also applicable to and useful for the detection of signals received via or processed by electrical or optical components, devices or circuits, as well as signals retrieved from various forms of signal storage media (e.g., magnetic, optical or electronic).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a crosstalk compensation engine for reducing signal crosstalk effects within a data signal, comprising:

a plurality of input signal terminals that convey a plurality of demultiplexed data signals corresponding to a plurality of multiplexed data signals received via a signal transmission medium, wherein first and second ones of said plurality of demultiplexed data signals correspond to first and second ones of said plurality of multiplexed data signals, respectively, and said first demultiplexed data signal includes a first signal crosstalk product related to an interaction among at least said first and second ones of said plurality of multiplexed data signals within said signal transmission medium;

an output signal terminal that conveys an output data signal corresponding to said first demultiplexed data signal and including a second signal crosstalk product corresponding to said first signal crosstalk product, wherein a ratio of said second signal crosstalk product and said output data signal is substantially less than another ratio of said first signal crosstalk product and said first demultiplexed data signal; and crosstalk compensation circuitry, coupled between said plurality of input signal terminals and said output signal terminal, that processes said plurality of demultiplexed data signals to provide said output data signal, wherein said crosstalk compensation circuitry comprises mutiplexing crosstalk compensation circuitry that compensates for signal crosstalk effects resulting from dense wavelength-division multiplexing of a plurality of input data signals used to provide said plurality of multiplexed data signals, and said multiplexing crosstalk compensation circuitry comprises signal combining circuitry, coupled to a first one of said plurality of input signal terminals, that receives and subtracts at least one processed signal from said first demultiplexed data signal to provide a resultant signal, nonlinear processing circuitry, coupled between at least a second one of said plurality of input signal terminals and said signal combining circuitry, that receives and nonlinearly processes at least said second one of said plurality of demultiplexed data signals to provide said at least one processed signal, and signal slicing circuitry, coupled to said signal combining circuitry, that receives and slices said resultant signal to provide said output data signal.

2. The apparatus of claim 1, wherein said signal slicing circuitry is further coupled to said at least said second one of said plurality of input signal terminals and receives said at least said second one of said plurality of demultiplexed data signals and in response thereto receives and slices said resultant signal to provide said output data signal.

3. The apparatus of claim 2, wherein said signal slicing circuitry comprises:

a first signal slicer, coupled to said at least said second one of said plurality of input signal terminals, that receives and slices said at least said second one of said plurality of demultiplexed data signals to provide a first sliced signal; and a second signal slicer, coupled to said first signal slicer and said signal combining circuitry, that receives said first sliced signal and in response thereto receives and slices said resultant signal to provide a second sliced signal as said output data signal.

4. A method for reducing signal crosstalk effects within a data signal, comprising:

receiving a plurality of demultiplexed data signals corresponding to a plurality of multiplexed data signals received via a signal transmission medium, wherein first and second ones of said plurality of demultiplexed data signals correspond to first and second ones of said plurality of multiplexed data signals, respectively, and said first demultiplexed data signal includes a first signal crosstalk product related to an interaction among at least said first and second ones of said plurality of multiplexed data signals within said signal transmission medium; and processing said plurality of demultiplexed data signals and providing an output data signal corresponding to said first demultiplexed data signal and including a second signal crosstalk product corresponding to said first signal crosstalk product, wherein a ratio of said second signal crosstalk product and said output data signal is substantially less than another ratio of said first signal crosstalk product and said first demultiplexed data signal, and said processing of said plurality of demultiplexed data signals and providing said output data signal comprises compensating for signal crosstalk effects resulting from dense wavelength-division multiplexing of a plurality of input data signals used to provide said plurality of multiplexed data signals by receiving and subtracting at least one processed signal from said first demultiplexed data signal and providing a resultant signal, receiving and nonlinearly processing at least said second one of said plurality of demultiplexed data signals and providing said at least one processed signal, and receiving and slicing said resultant signal and providing said output data signal.

5. The method of claim 4, further comprising receiving said at least said second one of said plurality of demultiplexed data signals, and wherein said receiving and slicing said resultant signal and providing said output data signal comprises receiving and slicing said resultant signal in response to said at least said second one of said plurality of demultiplexed data signals.

6. The method of claim 5, wherein said receiving and slicing said resultant signal in response to said at least said second one of said plurality of demultiplexed data signals comprises:

receiving and slicing said at least said second one of said plurality of demultiplexed data signals and providing a first sliced signal; and receiving said first sliced signal and in response thereto receiving and slicing said resultant signal and providing a second sliced signal as said output data signal.

* * * * *